United States Patent [19]

Shin

[11] Patent Number: 5,602,649
[45] Date of Patent: Feb. 11, 1997

[54] METHOD OF AUTOMATICALLY EDITING PROGRAMMED RECORDINGS

[75] Inventor: Yun S. Shin, Seoul, Rep. of Korea

[73] Assignee: Samsung Electronics Co., Ltd., Kyungki-do, Rep. of Korea

[21] Appl. No.: 309,503

[22] Filed: Sep. 23, 1994

[30] Foreign Application Priority Data

Sep. 24, 1993 [KR] Rep. of Korea ............... 93-19647

[51] Int. Cl.[6] ............................. H04N 5/76; H04N 9/79
[52] U.S. Cl. ..................... 386/83; 360/72.1; 360/74.1; 386/4; 386/52
[58] Field of Search ............................. 358/311, 335, 358/310, 342; 360/14.1, 72.1, 74.1; H04N 5/76, 5/92, 9/79

[56] References Cited

U.S. PATENT DOCUMENTS

| | | | |
|---|---|---|---|
| 4,745,549 | 5/1988 | Hashimoto | 364/402 |
| 4,972,288 | 11/1990 | Nishida | 360/137 |

*Primary Examiner*—Thai Q. Tran
*Assistant Examiner*—Luanne P. Din
*Attorney, Agent, or Firm*—Sughrue, Mion, Zinn, Macpeak & Seas

[57] ABSTRACT

An automatically editing method of programmed recordings is disclosed in which, when a plurality of different programs are reserved to be recorded, the same program can be continuously recorded together. The method according to the present invention, is carried out in such a manner that the total recording time and the total residue amount of the tape are calculated under the recording mode upon insertion of a tape, sectors are allocated by calculating the time per sector in accordance with the reserved programs, and the recording is carried out upon arriving at the reserved time and an index mark is put on the initial portion. After the recording, another index is put on the end portion of the recording and the system is put to a standby state until 5 minutes before the reserved time, and the next program sector is discriminated. By repeating the discrimination and movement to a discriminated sector, the reserved recordings are continued until the recorded number of programs become equal to the maximum recordable number, According to this method, users can watch recorded programs continuously by program regardless of the time.

11 Claims, 5 Drawing Sheets

METHOD OF AUTOMATICALLY EDITING PROGRAMMED RECORDINGS

BACKGROUND OF THE INVENTION

1. Field of the Invention

The present invention relates to a method of automatically editing programmed recordings, such that when a VCR is programmed to record a plurality of programs, related programs among the plurality of programs are recorded in a continuous manner.

2. Description of the Prior Art

Generally, users program their VCRs to record several programs during the week and then reproduce and watch the recorded programs all at once, such as on weekends. In particular, when a serial drama or an educational program is to be recorded by programmed recording, it is preferable to record related programs that, for example, are part of a series of programs, in a serial manner.

For example, the following programmed recordings are assumed to be carried out in the following manner.

Program A: 20:00–21:00, Tuesday through Friday.

Program B: 22:00–23:00, Wednesday and Friday.

In this case, as shown in FIG. 1, the programs are recorded in the order they are broadcast, namely: A, A', B, A", A''', B', where A corresponds to the first segment of program A broadcast on Tuesday, A' corresponds to the second segment of program A broadcast on Wednesday, B corresponds to the first segment of program B broadcast on Wednesday, and A" corresponds to the third segment of program A broadcast on Thursday, etc. That is, regardless of whether the subsequent program to be recorded is related to the previously recorded program, programs are recorded on the recording medium in the same order in which they are broadcast. Therefore, in order to watch a series of related recorded-programs in a continuous manner, a user must perform the bothersome operation of rewinding or fast forwarding the medium to the next recorded segment of the program.

Meanwhile, U.S. Pat. No. 4,745,549 entitled "METHOD OF AND APPARATUS FOR OPTIMAL SCHEDULING OF TELEVISION PROGRAMMING TO MAXIMIZE CUSTOMER SATISFACTION" discloses a technique such that an individual television program list can be edited according to the user's taste. This technique includes reading the user's favorable data based on a new subscriber's favorable data signal and questions, evaluating a television program in accordance with a predetermined standard for obtaining program evaluation data, generating an optimum program list in response to the program evaluation data and the subscriber's taste data, printing a program list on the recording medium from the optimum program list, correcting the program evaluation data, and inputting the corrected data to improve the reliability of the list and the user's dissatisfaction with the program list, and setting a VCR or television in accordance with the program list.

In the above described conventional technique, the optimum program list data can be edited according to the user's taste based on data signals and questions representing a new user's tastes. However, the above described invention cannot record a series of related programs in a continuous manner.

SUMMARY OF THE INVENTION

The present invention is intended to overcome the disadvantages of the conventional reserved recording techniques, described above.

Accordingly, it is an object of the present invention to provide a method for automatically editing programmed recordings, in which related programs can be continuously recorded by employing a known tape residue function and the known video index search system (VISS), thereby providing a convenient feature to users.

In achieving the above object, the method of automatically editing programmed recordings involves performing programmed recordings at a reserved time using a timer. Further, the method includes a residue calculating step for calculating a remaining vacant portion of the tape upon inserting the tape, a sector calculating step for calculating a maximum number of recordable programs and for allocating recording sectors by calculating the recording time per sector in accordance with a total remaining vacant portion of the tape, recording mode of the tape, and reserved programs, a movement amount determining step for determining the amount of movement of the tape to be moved to a program sector by determining the program sector to be recorded at the programmed recording time, and based on the total remaining vacant portion of the tape from the current position of the tape, and based on a time assigned to such a determined sector, a sector moving step for moving to the determined sector by carrying out fast forwarding or rewinding operation by an amount determined in the movement amount determining step, a recording step for recording a program at the determined sector and placing an index mark at the start of the recording and placing another index mark at the end of the recording, and, if the program at the determined sector is not the first program, searching for an index of a last recorded program within the sector, and recording a reserved program upon finding the index mark, and placing an index mark at the start of the recording and placing another index mark at the end of the recording, and finally counting the number of recorded programs, and a repeating step for carrying out the movement amount calculating step to record as many programs as possible, if the recorded programs as counted in the recording step are less than a calculated maximum number of recordable programs, thereupon terminating the programmed recording when a number of counted recording programs are equal to the maximum number of recordable programs.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 2:
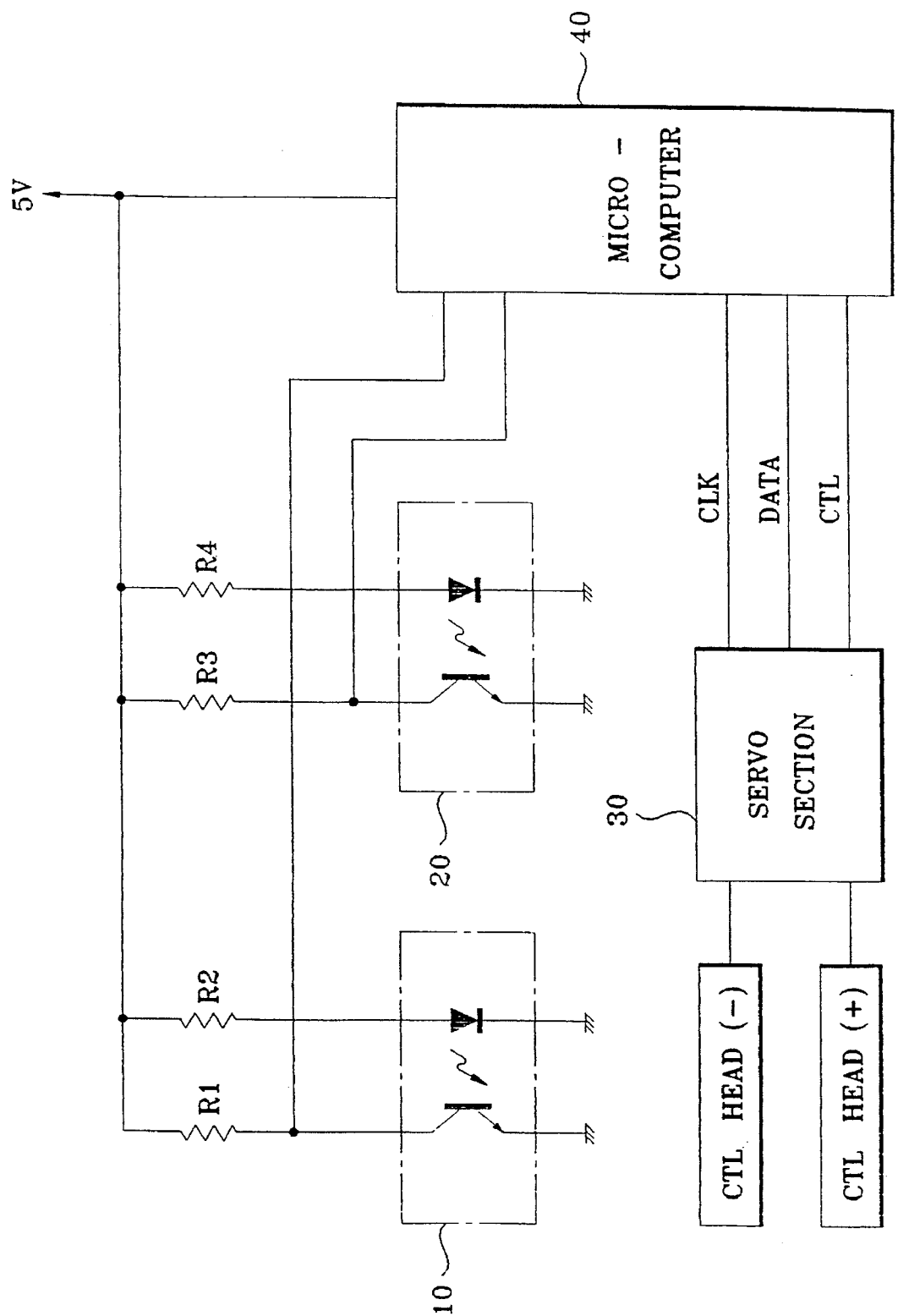
FIG. 2 illustrates a circuit for performing the method of automatically editing programmed recordings according to the present invention.

Referring to FIG. 2, a supply reel sensor 10 and a take-up reel sensor 20, which are formed by an optical coupler, sense the thickness of a tape, a winding speed, and an amount of wound tape. This data is output to microcomputer 40.

A servo section 30 controls the revolution of a drum motor and a capstan motor, and furnishes a clock CLK and data and control CTL signals to the microcomputer 40. The servo section 30 consists of a drum servo and a capstan servo.

When in a recording mode, the drum servo controls the revolution phase of the drum motor so that it is in synchronization with recorded normal video signals. Thus, vertical synchronizing signals from the video signals are recorded at predetermined positions of the tape. The capstan servo causes the capstan motor to revolve at a constant speed with a certain number of revolutions per unit time, so that the video signals are recorded on the tape with accurate pitches.

When in a reproduction mode, the drum servo controls the video signals so they do not vary with time, by revolving at a constant speed. The capstan servo controls a video head to exactly trace a recorded track, thereby reproducing video signals at a maximum level.

Figure 1:
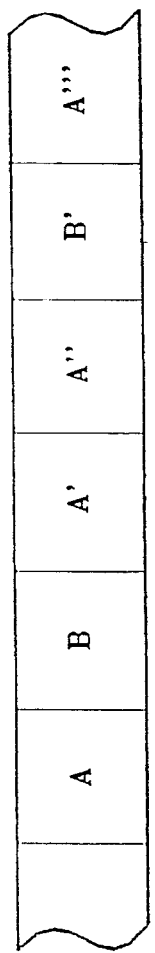
FIG. 1 illustrates an embodiment of a conventional programmed recording.
Figure 4:
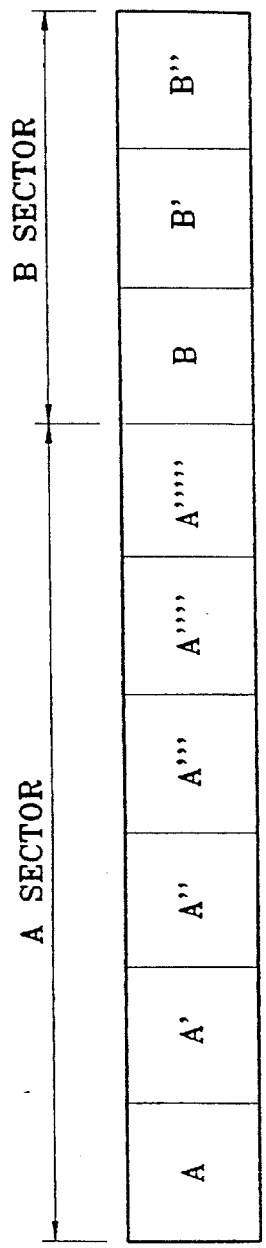
FIG. 4 illustrates an embodiment in which a plurality of programs are recorded according to the present invention.

Meanwhile, based on the control signals and data furnished by the supply reel sensor 10, the take-up reel sensor 20 and the servo section 30, the microcomputer 40 calculates a remaining vacant portion of the tape, or in other words the residual amount of tape that can be used for recording, and carries out the VISS function and the automatic editing of the programmed recording, as shown in FIG. 4, based on the residue function and the VISS function. That is, related programs, such as A, A', A", etc., are recorded continuously in sequence regardless of other intervening broadcast programs that are recorded.

The residue calculation function and the VISS function are known techniques, which are calculated as follows:

So: Total wound thickness of a tape (including a hub) [mm$^2$]

$r_H$: Diameter of the hub [mm]

v: 33.35 [mm/s] (SP for NTSC), 16.67 [mm/s] (LP for NTSC), 11.12 [mm/s] (SLP for NTSC); or 23.39 [mm/s] (SP for PAL), 12.69 [mm/s] (LP for PAL)

Ts: Revolution period of the supply reel [S], where the revolution period of the supply reel (one-eighth) is measured to below 0.65 ms.

Ttu: Revolution period of the take-up reel [S], where the revolution period of the take-up reel (one-eighth) is measured to below 0.65 ms.

Z: Speed ratio of FG (frequency generator) with regard to the SP (standard play) speed.

t: Tape thickness [mm]

y: Speed ratio of the tape transmitting speed to SP

Ls: Standard lengths of the respective tape +1000 mm [mm].

Decisions regarding the tape are carried out during reproduction, recording, FPS (forward picture search) and RPS (rewind picture search) operations. Further, upon detection of the end sensor when in a total residue mode, the time is set to "0:00". In the case of reproduction and recording operations, the residue calculation is carried out in the following manner.

First, Ts and Ttu are determined, and then, So is determined, as follows.

$$So = \frac{V^2}{4\pi}(Ts^2 + Ttu^2) \, [\text{mm}^2]$$

where v represents the value of the speed for the current speed mode.

The residue calculation is carried out during the discrimination of the tape, as follows.

$$Tr = \frac{\frac{v^2}{4\pi}Ts^2 - \frac{\pi r_H^2}{v}}{\frac{v^2}{4\pi}(Ts^2 + Ttu^2) - 2\pi r_H^2} \cdot Ls \, [\text{sec}]$$

The value obtained based on the above formula is converted into an hour:minute format to use as the residue data, indicating the amount of tape that can be used for recording. However, if it is found that the thickness of the tape is corrected as a result of discriminating the tape, the total tape amount calculation is made based on the following formula.

$$Tr = Ts^2 \frac{v}{4\pi t} - \frac{\pi r_H^2}{vt} \, [\text{sec}]$$

Meanwhile, in the case of FPS and RPS, the residue calculation is carried out based on the following formula, where the type of tape is first determined.

$$So = \frac{(xv)^2}{4\pi}(Ts^2 + Ttu^2)^2 \, [\text{mm}^2] \, (x = 2, 3, 5, \ldots)$$

Then the residue amount is calculated based on the following formula.

$$Tr^2 = \frac{\frac{xv}{4\pi}Ts^2 - \frac{\pi r_H^2}{xv}}{\frac{(xv)^2}{4\pi}(Ts^2 - Ttu^2) - 2\pi r_H^2} Ls, x[\text{sec}]$$

If the calculated value is converted into an hour:minute format, the total amount data is obtained.

Figure 3A:
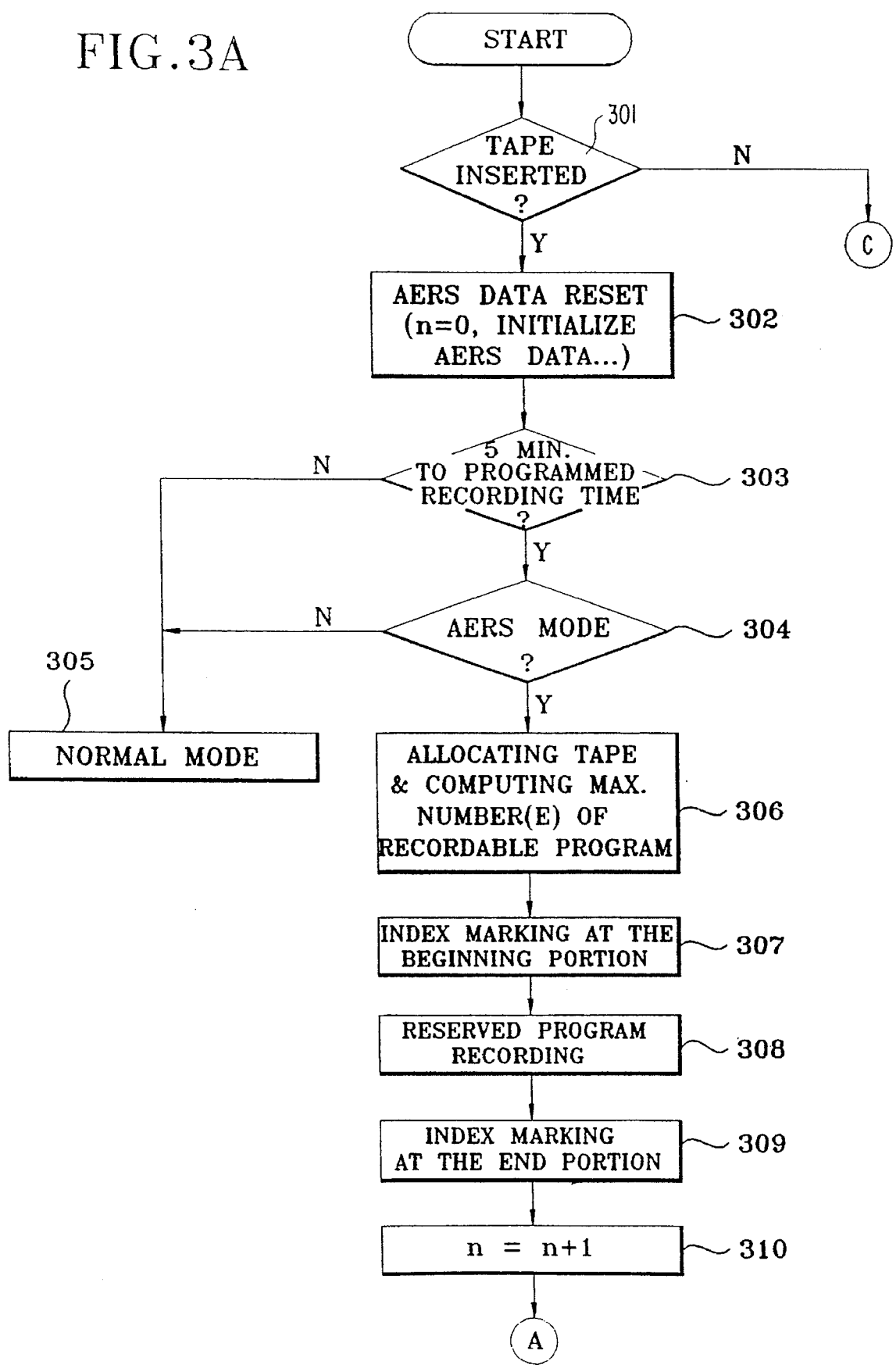
FIGS. 3A to 3C are flow charts for explaining the method of automatically editing programmed recordings according to the present invention.
Figure 3B:
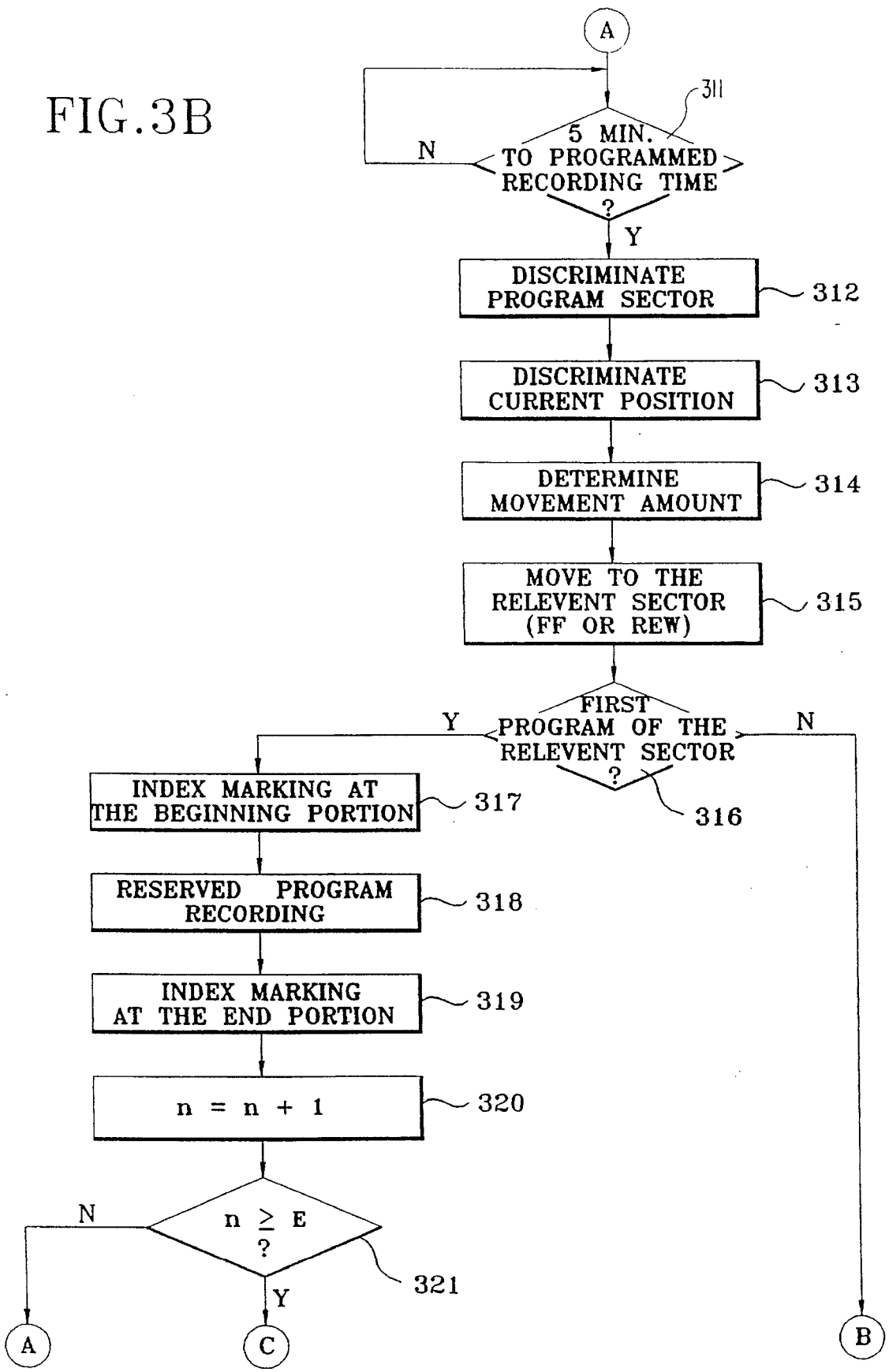
Figure 3C:
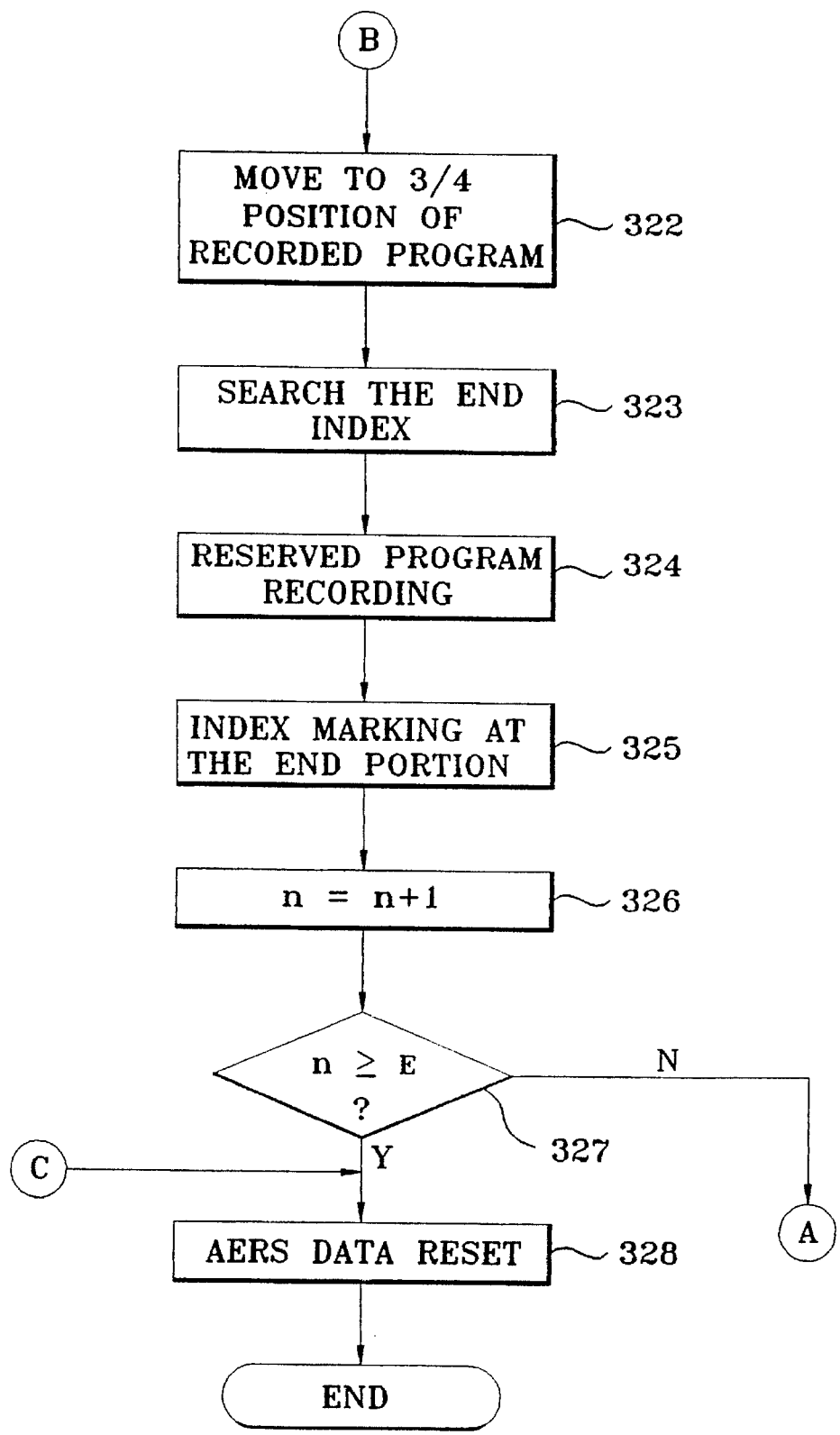

FIG. 3 is a flow chart for carrying out the method of automatically editing programmed recordings according to the present invention, wherein the logic represented by this flow chart is stored in a program ROM (not shown) of the microcomputer 40.

If recording is performed by an automatic editing programmed recording system (AERS), the user places the apparatus in an AERS mode by, for example, using a predetermined key input.

When in the AERS mode if it is determined that a tape has been inserted, the microcomputer 40 computes the residual amount of tape based on the above formula (step 301). Then the microcomputer 40 constantly computes the residual amount of the tape in accordance with the movement of the tape, and data related to the AERS is initialized (step 302). The AERS data refers to various parameters for carrying out the AERS, such as a program recording increase parameter n, a sector allocation parameter, a time parameter and the like.

Next, the current time is checked to determine if the time frame is within several minutes (e.g., 5 minutes) before a programmed recording time (step 303). The time frame at which the time is checked, at step 303, can be altered. In the present example, the time frame is assumed to be 5 minutes, and therefore, if it is determined that the current time is within 5 minutes before the programmed recording time, then it is determined whether or not the apparatus is in the AERS mode (step 304).

On the other hand, if it is found that the current time is not within 5 minutes before the programmed recording time at step 303, or if it is found at step 304 that the apparatus is not in the AERS mode, then a normal mode is entered (step 305).

However, if it is found, at step 304, that the apparatus is in the AERS mode, then a sector is allocated on the recording medium by microcomputer 40 by computing an sector time in accordance with the computed residual tape amount, recording modes (SP, LP, SLP), and the reserved programs. The sector time is calculated so that the number of programs S recordable within the same sector and the maximum number of programs E recordable on a single tape can be computed (step 306).

Next, the sector setting and sector allocating methods are hereinafter described in detail. For example, it is assumed that the number of programs reserved for timed recording under the AERS mode is 3 (A, B and C), and each recording time for each is indicated by At, Bt, and Ct, correspondingly to the programs A, B, and C, respectively. Then, the total recording time for the tape is indicated by Tt and the total recording time becomes Tn=At+Bt+Ct. Furthermore, the number of the intrasector recordable programs is S=Tt/Tn, wherein Tt is the total recording time for the tape according to a particular recording mode. Therefore, $$\text{Sector } A \text{ allocating time} = \frac{Tt}{Tn} \times At$$

$$\text{Sector } B \text{ allocating time} = \frac{Tt}{Tn} \times Bt$$

$$\text{Sector } C \text{ allocating time} = \frac{Tt}{Tn} \times Ct$$

Under this condition, the maximum number of recordable programs E can be obtained by multiplying the recordable number of programs for the same sector S by the reserved number of programs.

In the above example, it was assumed that there were three programs A, B and C, and therefore, the maximum number of recordable programs E is 6×3=18.

For example, programmed recording for a week is accomplished as follows. In the case where the timer is reserved under an AERS mode, such that At=1 hour, Bt=30 minutes, and Ct=30 minutes, if a super long play (SLP) recording is to be performed on a 240-minute tape, then the total recordable time Tt is 720 minutes.

In the SLP mode, both the tape speed and the video track pitch become ½ of that in the SP (standard play) mode. Therefore, $$\text{Sector } A \text{ allocating time} = \frac{720}{120} \times 60 = 360 \text{ minutes}$$

$$\text{Sector } B \text{ allocating time} = \frac{720}{120} \times 30 = 180 \text{ minutes}$$

$$\text{Sector } C \text{ allocating time} = \frac{720}{120} \times 30 = 180 \text{ minutes}$$

Meanwhile, the maximum recordable time for the same sector is as follows.

$$S = \frac{Tt}{Tn} = \frac{720}{120} = 6$$

That is, up to 6 related programs can be recorded in a single sector.

Under this condition, the sector priority is based on the program reservation order.

The first, second and third programs are assigned to the tape time based on the computed time. In the above example, program A occupies a sector A which starts at the beginning of the tape, program B occupies a sector B which starts at the point on the tape corresponding to a replay time of 360 minutes from the beginning of the tape, and program C occupies a sector C starting at a point corresponding to 540 minutes.

As described above, after establishing and allocating the sectors at step 306, when the programmed time for recording arrives, an index mark is placed at the beginning point for program A (step 307), and then program A is recorded (step 308). When the apparatus finishes recording program A, an index mark is placed at the end point of the recording (step 309). Then, the program recording increase parameter n is increased by 1, that is n=n+1 (step 310).

The system is then placed into a standby mode until 5 minutes before the programmed recording time, while in the AERS mode. At 5 minutes before the programmed recording time (step 311), the sector in which the next program is to be recorded is determined (step 312). Under this condition, the time frame for checking the amount of time before the program recording time, at step 311, can be changed. In the above example, it is determined that the next sector to be recorded is the sector B.

Then the current position is determined (step 313), and the amount of tape movement, or the movement amount, to reach sector B is determined (step 314). The movement amount refers to the amount of tape movement from the current position (which is determined at step 313) to sector B which is determined at step 312. Excluding the first sector (A), the sectors are allocated based on the recording time, and therefore, the movement amount can be obtained by subtracting the residual time corresponding to the determined sector from the residual time of the determined current position sector.

Then a fast forward (FF) or rewind (REW) operation is carried out to move the tape by the amount determined at step 314, thereby moving the tape to the relevant sector (step 315). That is, in the present example, the residual time of the current position is 660 minutes and the discriminated sector B starts at a point corresponding to 360 minutes. Therefore, the tape can be moved to the sector B by winding the tape at a high speed by 660–360 =300 minutes.

Next, it is determined whether or not a first programmed recording is being carried out in sector B (step 316). If it is determined that a first programmed recording is being carried out in sector B, and if the reserved time arrives, then an index mark is placed at the starting portion of sector B (step 317) and program B is recorded (step 318). When program B is completely recorded, an index mark is placed at the end point of the recording (step 319), and the program recording increase parameter n is increased by 1, that is n=n+1 (step 320).

A comparison is made to determine whether or not the value n (which is increased by 1 at step 320) is equal to or larger than the maximum number of recordable programs E, which is calculated at step 306 (step 321). If the value n is equal to or larger than E, then no more programs can be recorded, and accordingly, all the AERS data are reset and the AERS mode is exited (step 328). Exiting of the AERS mode can be carried out by a predetermined key input.

On the other hand, if the value n is smaller than the E, then more programs can be recorded and the system returns to step 311 and is placed in a standby mode until 5 minutes before the next reserved recording time.

In the present example, at 5 minutes before the timer reserved recording time, the next sector C on which the next program is to be recorded is discriminated and the current position are determined. Then the movement amount is determined, and the system moves the tape to the sector C by performing a high speed winding operation (step 311 through step 315).

Then a determination is made as to whether a first programmed recording is being carried out in sector C (step 316). When it is recognized that a first programmed recording is being carried out in sector C, and when the timer reserved time arrives, an index mark is placed at the starting point of sector C and program C is recorded. After completion of the recording of program C, another index mark is placed at the end point of the recording, and the program recording increase parameter n is increased by 1 (step 317 through step 320).

Then a comparison is made as to whether the increased value n (increased at step 320) is equal to or larger than the maximum number of recordable programs E computed at step 306 (step 321).

In the present example, E is taken to be 18, thus, n is smaller than E, and therefore, the system returns to step 311 and is put into a standby mode until 5 minutes before the reserved recording time.

At 5 minutes before the reserved recording time, the next program to be recorded relates to program A and the system determines that the program is to be recorded in sector A and determines the current tape position (steps 312 and 313).

Sector A is allocated to the initial portion of the tape, and therefore, movement to sector A can be achieved by rewinding from the current tape position to the initial portion of the tape (steps 314 and 315), Next, it is determined whether the program to be recorded in sector A is the first program (step 316). Here, a first program has already been recorded in sector A at step 308, and accordingly, a fast forwarding or rewinding operation is carried out to move the tape to a position three-quarters of the way through the first program (step 322). The apparatus then searches for the index mark placed at the end of the recorded portion of the first program at step 309 (step 323).

Once the end index is located, the next program (A') related to program A is recorded starting from the position of that end index mark (step 324). After completion of the recording, an index mark is placed at the end portion of that recording (step 325), and the program recording increase parameter n is increased by 1 (step 326). A comparison is then made whether the increased value n is equal to or larger than the maximum number of recordable programs E, which is computed at step 306 (step 327).

Now, at step 327 the increased value n is 4, and the maximum number of recordable programs E is 18 according to the present embodiment. Therefore, the system returns to step 311 and is placed into a standby mode until 5 minutes before the next reserved recording time.

Accordingly, steps 311–316 and step 322–327 are repeatedly carried out until 18 programs consisting of 6 programs are recorded in each of the respective sectors A, B and C. At this point it is determined that the program recording increase parameter n becomes equal to the maximum number of recordable programs E. Therefore, no further programs can be recorded on the tape, and all AERS data are reset, and the AERS mode is exited (step 328).

According to the present invention as described above, the known tape residue function and VISS function are utilized in such a manner that related programs can be recorded continuously regardless of the time they are broadcast. Therefore, users can continuously watch the recorded programs which are related, such as a program series. Furthermore, separate hardware is not required, and therefore, the product is improved without incurring additional expense.

What is claimed is:

1. A method for automatically editing programmed recordings, wherein a plurality of programs are reserved to be recorded on a tape by a recording apparatus, comprising the steps of:

determining a residual amount of tape to be recorded;

determining a maximum number of recordable programs on the tape;

allocating program sectors on the tape based on said residual amount of tape and the reserved programs; and determining which of said allocated program sectors each of the reserved programs is to be recorded, and recording said each of the reserved programs in said determined program sector such that related ones of the reserved programs are recorded in the same program sector.

2. A method for automatically editing programmed recordings for programs to be recorded on a tape at reserved times by a recording apparatus, comprising the steps of:

a residue calculating step for calculating a residual time corresponding to a remaining vacant portion of the tape upon inserting the tape into the recording apparatus;

a sector calculating step for calculating a maximum number of recordable programs and allocating program sectors by calculating a recording time per sector in accordance with said remaining vacant portion of the tape, a recording mode of the tape, and the reserved programs;

a movement amount determining step for determining one of said allocated program sectors for recording one of said reserved programs at its reserved recording time, and determining an amount of movement to move the tape to said one of said allocated program sectors based on a current position of the tape and a time assigned to said determined program sector;

a sector moving step for moving the tape to said determined program sector by performing one of a fast forwarding and a rewinding operation based on said determined amount of movement;

a recording step for recording said one of said reserved programs at said determined program sector and recording a first index at a start of said recording and recording a second index at an end of said recording, and if a first program is recorded at said determined program sector, searching for an index of a last recorded program within said determined program sector, and recording said program upon finding said index of a last recorded program, and recording a first index at the start of said recording and recording a second index at the end of said recording, and counting the number of recorded programs; and a repeating step for carrying out said movement amount determining step to record as many programs as possible, if said number of recorded programs is less than said maximum number of recordable programs, and terminating the programmed recording when said number of recording programs is equal to said maximum number of recordable programs.

3. The method as claimed in claim 2, wherein said sector calculating step further comprises the steps of:

calculating a total recordable time of the tape based on said recording mode and said vacant portion of the tape;

calculating a sum of the recording times of the reserved programs;

dividing said calculated total recordable time of said tape by said sum of the reserved recording times; and multiplying said divided value by said recording time per sector.

4. The method as claimed in claim 2, wherein in said sector calculating step a first sector is allocated at a starting portion of the tape, and subsequent sectors are allocated based on said recording time per sector.

5. The method as claimed in claim 3, wherein in said sector calculating step a first sector is allocated at a starting portion of the tape, and subsequent sectors are allocated based on said recording time per sector.

6. The method as claimed in claim 2, wherein said sector calculating step further comprises the steps of:

calculating a total recordable time of the tape (Tt) based on the recording mode and the total vacant portion of the tape;

calculating a total recording time (Tn) by summing the recording times for the allocated sectors; and obtaining a maximum number of recordable programs within a same sector by dividing said total recordable time of the tape (Tt) by said total recording time (Tn).

7. The method as claimed in claim 2, wherein said sector calculating step further comprises the step of:

calculating a maximum recordable number of programs (E) by multiplying a maximum number of recordable programs within a same sector by the number of reserved programs.

8. The method as claimed in claim 6, wherein said sector calculating step further comprises the step of:

calculating a maximum recordable number of programs (E) by multiplying said maximum number of recordable programs within a same sector by the number of reserved programs.

9. The method as claimed in claim 2, wherein at said movement amount determining step said current position of the tape is determined based on a residual amount of the tape.

10. The method as claimed in claim 2, wherein said movement amount determined in said movement amount determining step is determined by subtracting the time corresponding to the determined program sector from a residual the time determined from said current position.

11. The method as claimed in claim 9, wherein said movement amount determined in said movement amount determining step is determined by subtracting the time corresponding to the residual determined program sector from the residual time determined from said current position.

* * * * *